United States Patent [19]

Yoshida et al.

[11] 4,105,998
[45] Aug. 8, 1978

[54] PATTERN RECOGNITION PROCESSING SYSTEM

[75] Inventors: Masumi Yoshida, Kawasaki; Kiyoshi Iwata; Eiichiro Yamamoto, both of Yokohama; Takeshi Masui, Kawasaki; Yukikazu Kabuyama, Yokohama, all of Japan

[73] Assignee: Fujitsu Limited, Kawasaki, Japan

[21] Appl. No.: 780,111

[22] Filed: Mar. 22, 1977

[30] Foreign Application Priority Data

Mar. 30, 1976 [JP] Japan ............................... 51-34672
Mar. 30, 1976 [JP] Japan ............................... 51-34678

[51] Int. Cl.$^2$ .............................................. G06K 9/12
[52] U.S. Cl. .......................................... 340/146.3 AC
[58] Field of Search .............. 340/146.3 AC, 146.3 R, 340/146.3 J, 146.3 MA

[56] References Cited

U.S. PATENT DOCUMENTS

| | | | |
|---|---|---|---|
| 3,786,416 | 1/1974 | Bhimani | 340/146.3 AC |
| 3,860,909 | 1/1975 | Demonte | 340/146.3 AC |
| 3,975,710 | 8/1976 | Watanabe et al. | 340/146.3 C |
| 3,999,161 | 12/1976 | Van Bilzem et al. | 340/146.3 AC |

*Primary Examiner*—Leo H. Boudreau
*Attorney, Agent, or Firm*—Staas & Halsey

[57] ABSTRACT

A pattern recognition processing system in which variations in a character, pattern or the like, especially in a handwritten one, are suppressed to extract its invariable characteristics, ensuring accurate recognition of the character, pattern or the like. The pattern to be recognized is divided into circumscribed quadrangular areas and scanned in horizontal and vertical directions to extract reflection segments between the vertical frames of the circumscribed quadrangular areas and particular segments between adjacent ones of pattern strokes. Further, endpoints of these reflection and particular segments are checked in directions across the scanning directions to extract those endpoints which are not blocked by the pattern strokes, and the corresponding positions of the co-ordinates of these endpoints on a figure frame in the directions across the scanning directions are encoded to extract characteristics of contours of the pattern to be recognized.

10 Claims, 66 Drawing Figures

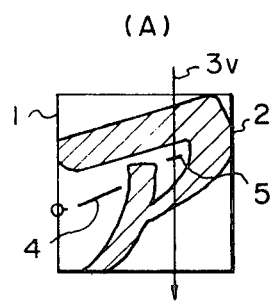
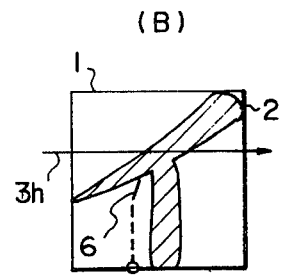
FIG. 1A
FIG. 1B
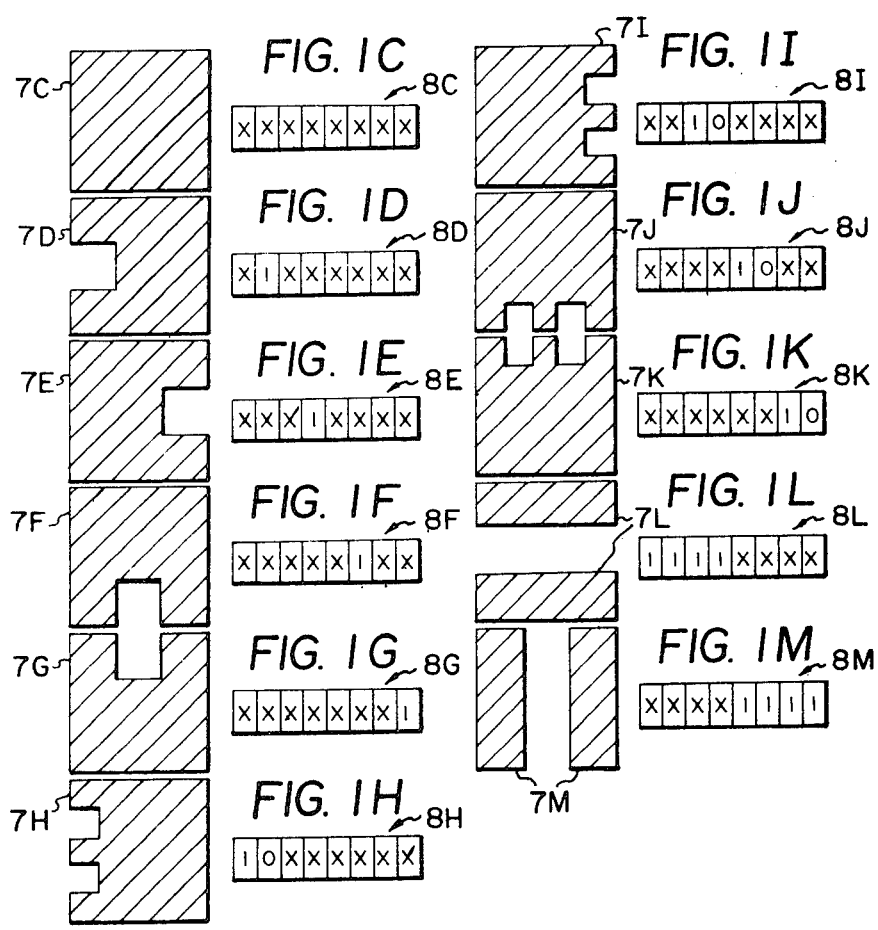

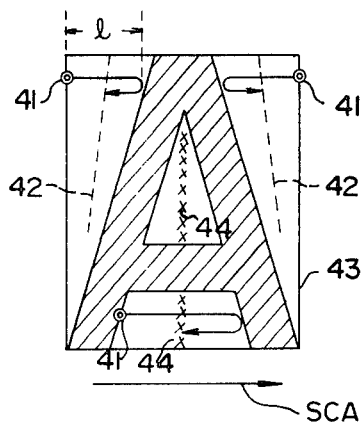
FIG. 11A
SCANNING DIRECTION
FIG. 11B
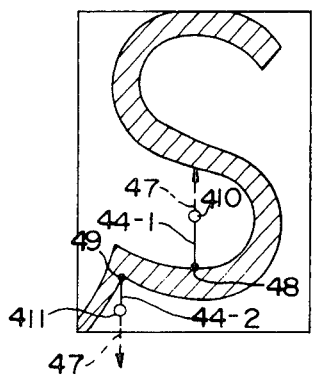
FIG. 11C
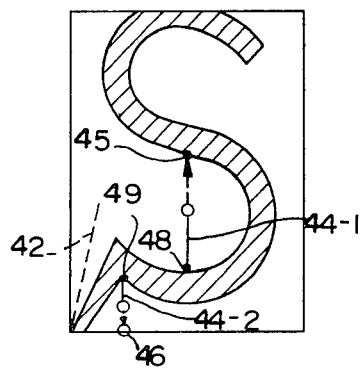
FIG. 11D
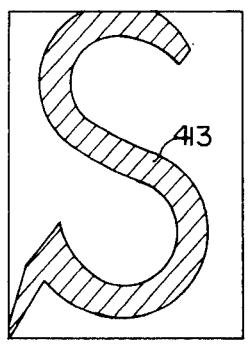
FIG. 11E
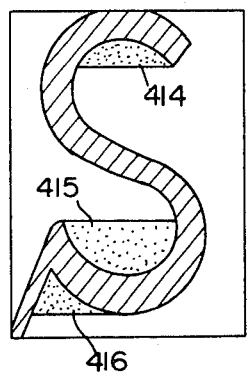

PSC    RSC

PATTERN RECOGNITION PROCESSING SYSTEM

BACKGROUND OF THE INVENTION

1. Field of the Invention

This invention relates to a pattern recognition processing system, and more particularly to a pattern recognition processing system in which characteristics of contours of a pattern to be recognized are extracted and respectively classified into groups and then the characteristics of each group are further classified for recognizing the pattern.

2. Description of the Prior Art

Generally, in the recognition of a pattern, the pattern is scanned so as to be divided into, for example, 30 × 30 meshes, the meshes are converted into binary-coded digital signals, and smoothing of pattern stroke, removal of an isolated point or like preprocessing is achieved by mask matching, and then characteristics of the pattern are extracted.

In the case of the recognition of a printed pattern, its characteristics can be easily extracted by mathematics. For the recognition of a handwritten pattern, however, it is necessary to find out invariable characteristics of the pattern by suppressing its variations inevitably resulting from handwriting. The pattern recognition is achieved based on strokes forming the pattern, or white areas formed by the pattern. In other words, the pattern recognition depends upon how faithfully the pattern seen by the naked eyes is reflected on recognition.

To this end, there have been proposed methods for recognizing a handwritten pattern by a reflection method, a trace method and a rolling method.

With the reflection method, the pattern is divided into circumscribed quadrangular areas and scanned along each row or in a horizontal direction to obtain represented segments between the circumscribed quadrangular frames (refer to 43 in FIG. 11A) and pattern strokes and between adjacent ones of the pattern strokes, and characteristics of the pattern are extracted based on the represented segments. The former represented segment is called the reflection segment (refer to 42 in FIG. 11A) and the latter represented segment is called the particular segment (refer to 44 in FIG. 11A). These represented segments are each formed by putting together points obtained by reflections when waves from the scanning starting positions (refer to 41 in FIG. 11A) strike against the pattern strokes (refer to the operations from three positions indicated by 41 in FIG. 11A). In this case, if points in the respective rows and columns are continuous, it is regarded as a characteristic of the pattern and if the points are discontinuous, it is not picked up as a pattern characteristic. Though differing with the ratio of the reflected position (refer to 1 in FIG. 11A) of the wave emitted from the starting point to the distance between adjacent pattern strokes, in the case of a steeply inclined pattern stroke, reflection segments are extracted, and in the case of a gently inclined pattern storke, they do not exist.

The particular segment is obtained in a similar manner.

Thus, the compressed white area present between the figure frame and the pattern stroke is represented by the reflection segment and the compressed white area present between the pattern strokes is represented by the particular segment, and clustering of the pattern is achieved by macroscopic characteristics obtained with the represented segments. Then, microscopic characteristics of the pattern obtained by the trace method and the rolling method are combined to determine an ultimate pattern.

The trace method is to extract parts which are invariable independently of variations in handprinting, i.e. endpoints, beinding points and cross-points.

The rolling method is to extract straight parts of the pattern stroke and clarify their interlinking relationship by making a round of the pattern stroke.

For the reflection method, refer to the following literature:

(i) Yoshida, Iwata and Yamamoto, "The Recognition of Hand-Written Katakana and Numeral" (Institute of Electronics and Communication Engineers of Japan, Research Data PRL 75-12 (1975-6))

(ii) Yoshida, Iwata and Yamamoto, "The Recognition of 48 Handprinted Katakanas" (Institute of Electronics and Communication Engineers of Japan, Research Data PRL 75-9 (1975-05)

For the trace method, refer to the following literature:

(iii) Yoshida, Iwata and Yamamoto, "The Recognition of 48 Handprinted Katakanas" (Institute of Electronics and Communication Engineers of Japan, Research Data PRL 75-9 (1975-05)

(iv) Kano, Toriwaki and Fukumura, "A Method for Convering Shaded Pattern into Linear Pattern" (Journal of Institute of Electronics and Communication Engineers of Japn 1972-10)

For the rolling method, refer to the following literature:

(v) The Literature (i)

(vi) E. C. Greanias, et al, "The Recognition of Hand-Written Numerals by Contour Analysis," IBM Journal (Jan. 1963)

(vii) Tomita "The Recognition of Hand-Written Katakanas" (Journal of Institute of Electronics and Communication Engineers of Japan, 50, 4 (1967-4))

As described above, in the prior art, the pattern is subjected to clustering based on the macroscopic information obtained by the reflection method, and then the pattern is recognized with the microscopic information obtained by another method. However, in the case of the number of categories of the pattern to be recognized being increased, recognition is difficult by the use of the above individual characteristic extraction methods. In this case, the kinds of figures increases as compared with those in the case of recognizing the pattern based on the individual characteristics, so that the amount of information to be extracted will naturally increase. Further, the difference in the shapes of figures becomes great and the number of similar figures also increases, so that, it is impossible to extract the characteristics of the pattern with the method of recognizing individual categories only.

SUMMARY OF THE INVENTION

A primary object of this invention is to provide a pattern recognition processing system which is suitable for clustering processing even in the case of a large number of categories of patterns to be recognized.

Another object of this invention is to provide a pattern recognition processing system which enables high-speed extraction of macroscopic characteristics of a pattern to be recognized.

Another object of this invention is to provide a pattern recognition processing system which enables extraction of reflection and particular segments relying on contours of a pattern to be recognized.

Another object of this invention is to provide a pattern recognition processing system in which a non-blocked reflection segment and a non-blocked particular segment are obtained and their corresponding positions on the figure frame of a pattern to be recognized are encoded, thereby to obtain characteristics of contours of the pattern.

Still another object of this invention is to provide a pattern recognition processing system in which extracted particular segment endpoints (refer to 45 and 46 in FIG. 11C) or reflection segment endpoints are apparently extended and the particular segments having their extended endpoints blocked by pattern strokes (refer to 44-2 in FIG. 11C. 44-1 is a particular segment having its extended endpoint blocked by a pattern stroke) are ignored, thereby to obtain characteristics of ⌐ or ⌐-shaped profile of a pattern to be recognized.

The abovesaid objects are achieved by providing a pattern recognition processing system which comprises (a) means for determining a reflection segment 42 and the coordinates of starting and terminating endpoints 48, 49 and 410, 411 of particular segments 44-1 and 44-2 in FIGS. 11B and C, (b) means for extracting from the coordinates determined by the means (a) the reflection segment segment and the particular segment (refer to 44-2 in FIG. 11C) that the line extending in a direction perpendicular to the scanning direction is not blocked by a pattern stroke, and (c) means for coding the point of extension (refer to 46 in FIG. 11C) of the segment extracted by the means (b) on the figure frame.

BRIEF DESCRIPTION OF THE DRAWINGS

FIGS. 1A to 1M, inclusive, are explanatory of encoding based on particular segments according to this invention;

FIGS. 11A to 11E are diagrams showing characters "A" and "S", for explaining the definition of terms concerning the reflection segment and the particular segment;

DESCRIPTION OF THE PREFERRED EMBODIMENTS

Figure 2A:
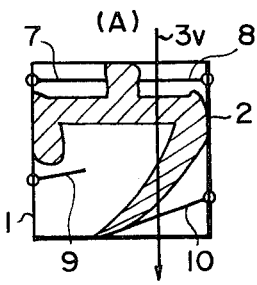
FIGS. 2A to 2I, inclusive, are explanatory of encoding based on vertical scanning reflection segments according to this invention.

FIGS. 1A to 1M are explanatory of coding based on particular segments in accordance with this invention.

In FIGS. 1A to 1M, reference numeral 1 indicates figure-frames; 2 designates patterns to be recognized, 3 identifies scanning lines; 4, 5 and 6 denote particular segments; 7C to 7M represent approximation of characters profile by using non-blocked particular segments according to this invention; and 8C to 8M show 8-bit codes respectively corresponding to the profile figures.

The particular segments 4 to 6 in the present invention may be considered to be obtained in the following manner. The particular segments 4 and 5 are vertical scanning particular segments which are obtained by such vertical scanning as shown in FIG. 1A.

Of the particular segments obtained as shown in FIGS. 1A and 1B, the segment 5 blocked at both ends by the pattern strokes is ignored and only the segments such as the particular segments 4 and 6 (hereinafter referred to as the non-blocked particular segments) are extracted and encoded. This may be considered to be aimed at utilization of those segments corresponding to the profile of the pattern to be recognized.

In the present invention, the endpoints of the non-blocked particular segments 4 and 6 are extended in directions perpendicular to the said scanning directions, and it is checked what positions on the figure frame 1 the extensions of the segments reach, and then the particular segments are encoded. FIG. 1C shows the case where no non-blocked particular segment exists, FIG. 1D the case where only one non-blocked particular segment obtained by scanning in one direction exists and reaches the left-hand side of the figure frame 1, FIG. 1E the case where a similar segment reaches the right-hand side of the figure frame 1, FIG. 1F the case where a similar segment reaches the lower side of the figure frame 1, FIG. 1G the case where a similar segment reaches the upper side of the figure frame 1, FIG. 1H the case where two non-blocked particular segments obtained by scanning in one direction exist and reach the left-hand side of the figure frame 1, FIG. 1I the case where similar segments reach the right-hand side of the figure frame 1, FIG. 1J the case where similar segments reach the lower side of the figure frame 1, FIG. 1K the case where similar segments reach the upper side of the figure frame 1, FIG. 1L the case where a non-blocked particular segment the both ends of which are not blocked exists and reaches the right- and left-hand sides of the figure frame 1, and FIG. 1M the case where similar segment reaches the upper and lower sides of the figure frame 1.

The eight bits forming the code of each of FIGS. 1C to 1M are divided into four pairs of bits, the leftmost pair, the second and third pairs from the left and the rightmost pair respectively corresponding to the left-hand, right-hand, lower and upper sides of the figure frame. In the case of one non-blocked particular segment, only the low-order one of the two bits is set to "1"; in the case of two non-blocked particular segments, the two bits are set to "1, 0"; and in the case of the both ends of the particular segment being not blocked, the two bits are set to "1,1".

In the case of a character, there do not exist three or more depressions of the contour in one side thereof. If they exist, the same code as in the case of two depressions is used, assuming that the depressions ae two or more.

Figure 2B:
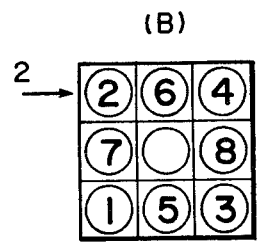
Figure 2C:
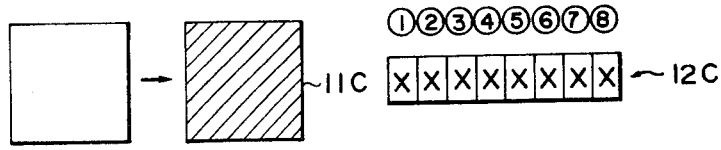
Figure 2D:
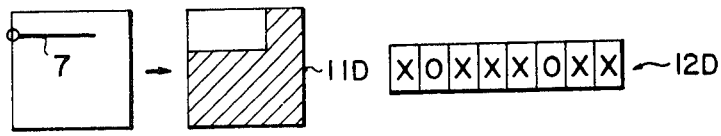
Figure 2E:
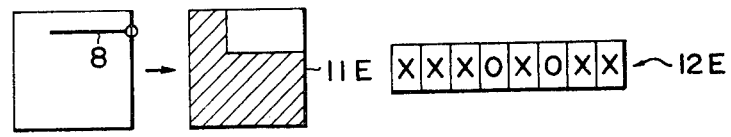
Figure 2F:
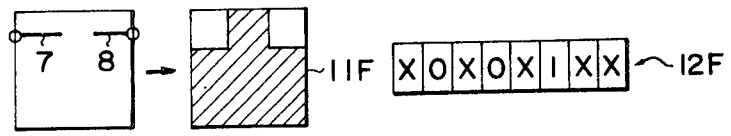
Figure 2G:
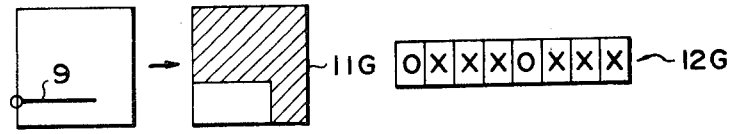
Figure 2H:
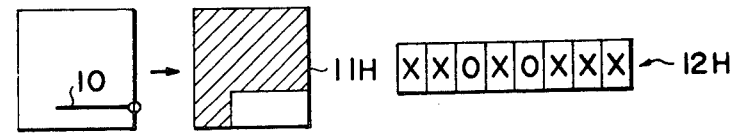
Figure 2I:
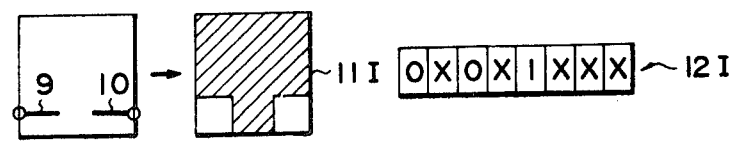

FIGS. 2A to 2I show coding of the non-blocked reflection segments obtained by vertical scanning. That is, the non-blocked segments are encoded depending upon what positions of the figure frame 1 their endpoints reach. In FIGS. 2A to 2I, reference numerals 1, 2 and 3 correspond to those in FIGS. 1A and 1B; 7 to 10 indicate vertical scanning reflection segments; 11C to 11I respectively designate profile figures stereotyped by using non-blocked reflection segments of the vertical scanning; and 12C to 12I show 8-bit codes respectively corresponding to the profile figures. The logic "1" or "0" at positions one to eight in the abovesaid 8-bit code may be considered to correspond to a black or white state of those areas into which the profile figures 11C to 11I are each divided, as shown in FIG. 2B. For example, in the profile figure 11F, the areas②and④are in the white state and the area⑥is in the black state. Accordingly, in the code 12F, the bits corresponding to the areas②and④are set at "0" and the bit corresponding to the area⑥is set at "1".

Figure 3A:
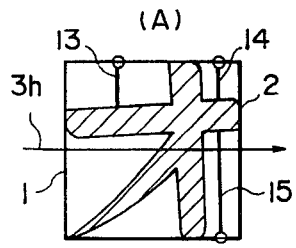
FIGS. 3A to 3I, inclusive, are explanatory of encoding based on horizontal scanning reflection segments according to this invention.
Figure 3B:
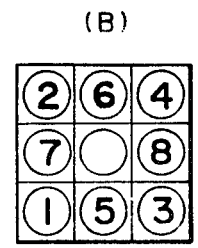
Figure 3C:
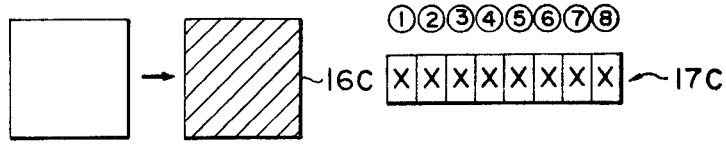
Figure 3D:
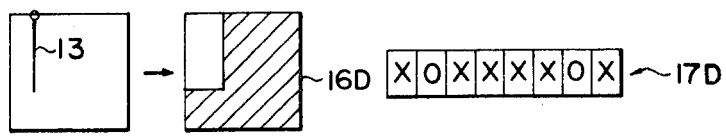
Figure 3E:
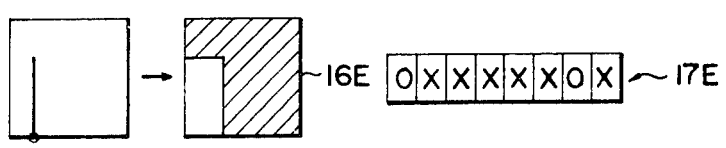
Figure 3F:
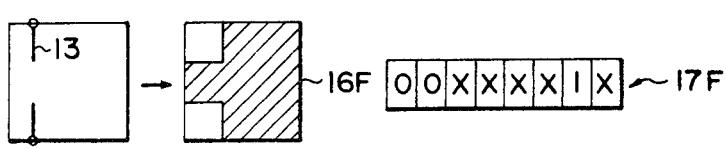
Figure 3G:
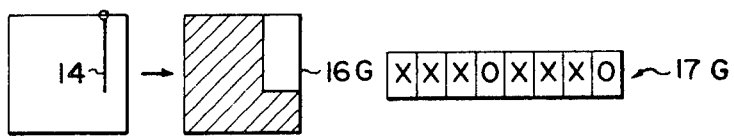
Figure 3H:
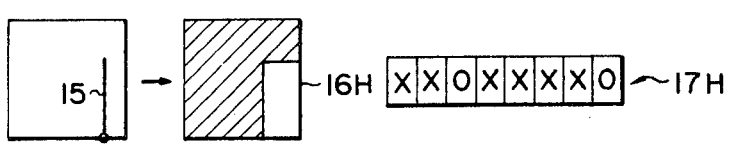
Figure 3I:
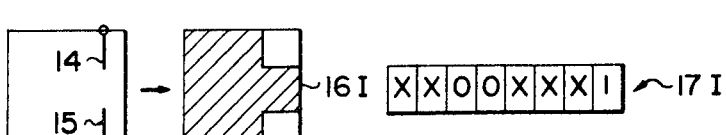

FIGS. 3A to 3I show coding of the non-blocked reflection segments obtained by horizontal scanning. This is, the non-blocked segments are encoded depending upon what positions of the figure frame 1 their endpoints reach. In FIGS. 3A to 3I, reference numerals 1, 2 and 3 correspond to those in FIGS. 1A and 1B; 13 to 15 indicate horizontal scanning reflection segments; 16C to 16I respectively designate profile figures stereotyped by using the non-blocked reflection segments of the horizontal scanning; and 17C to 17I show 8-bit codes respectively corresponding to the profile figures. The profile figure of FIG. 3B is divided into individual areas in exactly the same manner as in FIG. 2B. For instance, in the profile figure 16D, since the areas②and ⑦are in the white state, the bits of code 17D corresponding to the areas②and⑦are set to the logic "0". In the profile 16I, since the areas③and④are in the white state and since the area⑧is in the black state, the bits of the code 17I corresponding to the areas③and④are set to the logic "0" and the bit corresponding to the area⑧ is set to the logic "1".

FIGS. 4A to 4D show Japanese katakana letters " ア ", " イ ", " ウ " and " エ " encoded by the abovesaid coding process. In FIGS. 4A to 4D, the particular segments and reflection segments extended to the figure frame 1 are indicated by black and white circles, respectively.

Figure 4A:
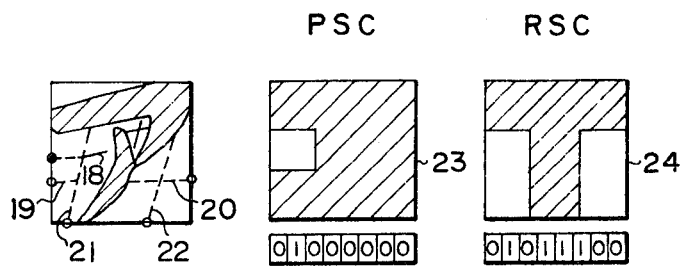
FIGS. 4A to 4D, inclusive, are explanatory of encoding in the cases where patterns to be recognized are Japanese Katakanas "ア", "イ", "ウ" and "エ", respectively.

In FIG. 4A, is shown a non-blocked particular segment 18 by vertical scanning, non-blocked reflection segments 19 and 20 by vertical scanning and non-blocked reflection segments 21 and 22 by horizontal scanning. Consequently, the profile figure by the particular segment becomes such a figure as indicated by 23 and the profile figure by the reflection segments becomes such a figure as indicated by 24. And their codes are "01000000" and "01011100", respectively. Namely, in the coding, in the case of the particulr segment, the 8-bit codes are divided into four pairs of bits, the leftmost pair, the second and third pairs from the left and the rightmost pair respectively corresponding to the left-hand, right-hand, lower and upper sides of the figure frame. On the other hand, in the case of the reflection segment, the eight bits correspond to the areas into which the figure is divided, as described above with regard to FIG. 2B.

Figure 4B:
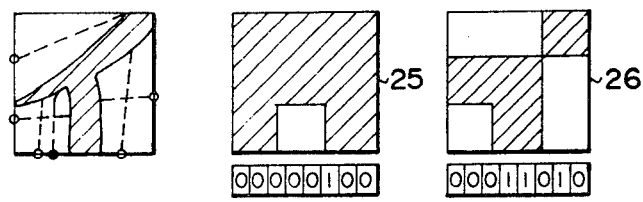
Figure 4C:
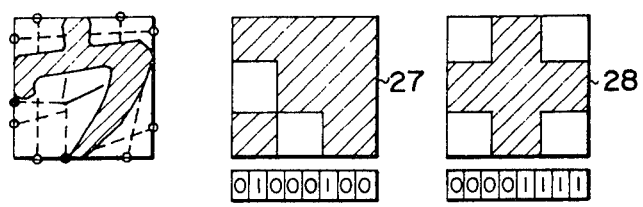
Figure 4D:
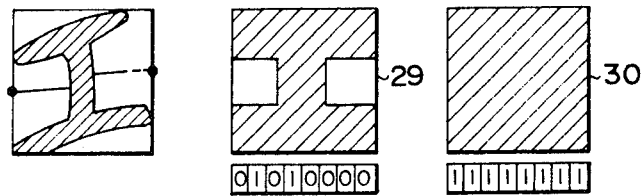

Similarly, the profile figure in the case of FIG. 4B is represented by FIGS. 25 and 26 and their codes are "00000100" and "00011010", respectively. In the case of FIG. 4C, the profile figure is represented by FIGS. 27 and 28 and their codes are "01000100" and "00001111", respectively. Further, in the case of FIG. 4D, the profile figure is represented by FIGS. 29 and 30 and their codes are "01010000" and "11111111", respectively.

By reference to these stereotyped profile figures and codes, it will be seen that this invention provide characteristics which are not affected by the variations of a pattern to be recognized and preferred for clustering.

That is, as is apparent from the profile figures 23, 25, 27 and 29 in FIGS. 4A to 4D, a characteristic of a U-letter form (凵-shaped) can be extracted by the non-blocked particular segment and, as is evident from the profile figures 24, 26 and 28, a characteristic of an inverted T-letter form (凸-shaped) can be extracted by the non-blocked reflection segment.

A description will be given of the concept of pattern recognition based on the particular segment extracted by the characteristic extractor of this invention.

In FIGS. 5A to 5F, reference numeral 1 indicates figure frames; 2 designates patterns to be recognized; 9 identifies what are called profile figures in this invention, representing the profiles of the patterns 2 to be recognized; 4 to 8 denote particular segments; $3h$ represents horizontal scanning lines; and $3v$ shows vertical scanning lines.

Figure 5A:
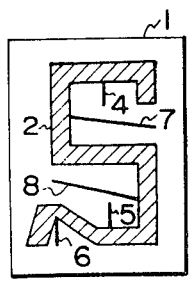
FIGS. 5A to 5F, inclusive, are explanatory of the concept of pattern recognition based on particular segments extracted by a characteristic extractor embodying this invention.

In The recognition of such a pattern 2 as shown in FIG. 5A, it is considered to extract the particular segments 4 to 8 which represent white areas defined between pattern strokes of the pattern 2. However, as the number of categories of recognition increases, processing for clustering the pattern to be recognized becomes necessary, and it is desired to imagine the profile figure 9 (refer to FIG. 5A) corresponding to the profile of the pattern to be recognized and extract the particular segments 6 to 8 for the profile figure 9, as described at the beginning of this specification.

Figure 5B:
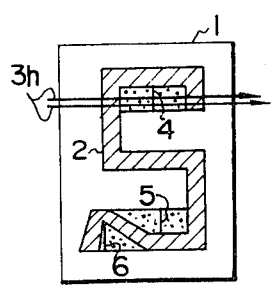

The particular segments 4 to 8 shown in FIG. 5A are obtained, for instance, by such process as set forth hereunder:

(1) As shown in FIG. 5B, the pattern to be recognized is scanned, for example, in the horizontal direction, following the scanning lines $3h$ to obtain the horizontal scanning particular segments 4, 5 and 6 which represent dotted white areas, that is, white areas defined between the pattern strokes.

Figure 5C:
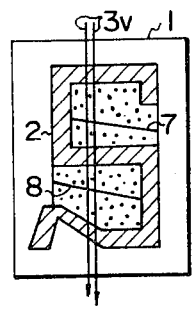

(2) As illustrated in FIG. 5C, the pattern is scanned, for instance, in the vertical direction, following the scanning lines $3v$ to obtain the vertical scanning particular segments 7 and 8 which represent dotted white areas, that is, white areas defined between the pattern strokes.

Figure 5D:
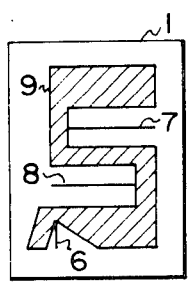
Figure 9:
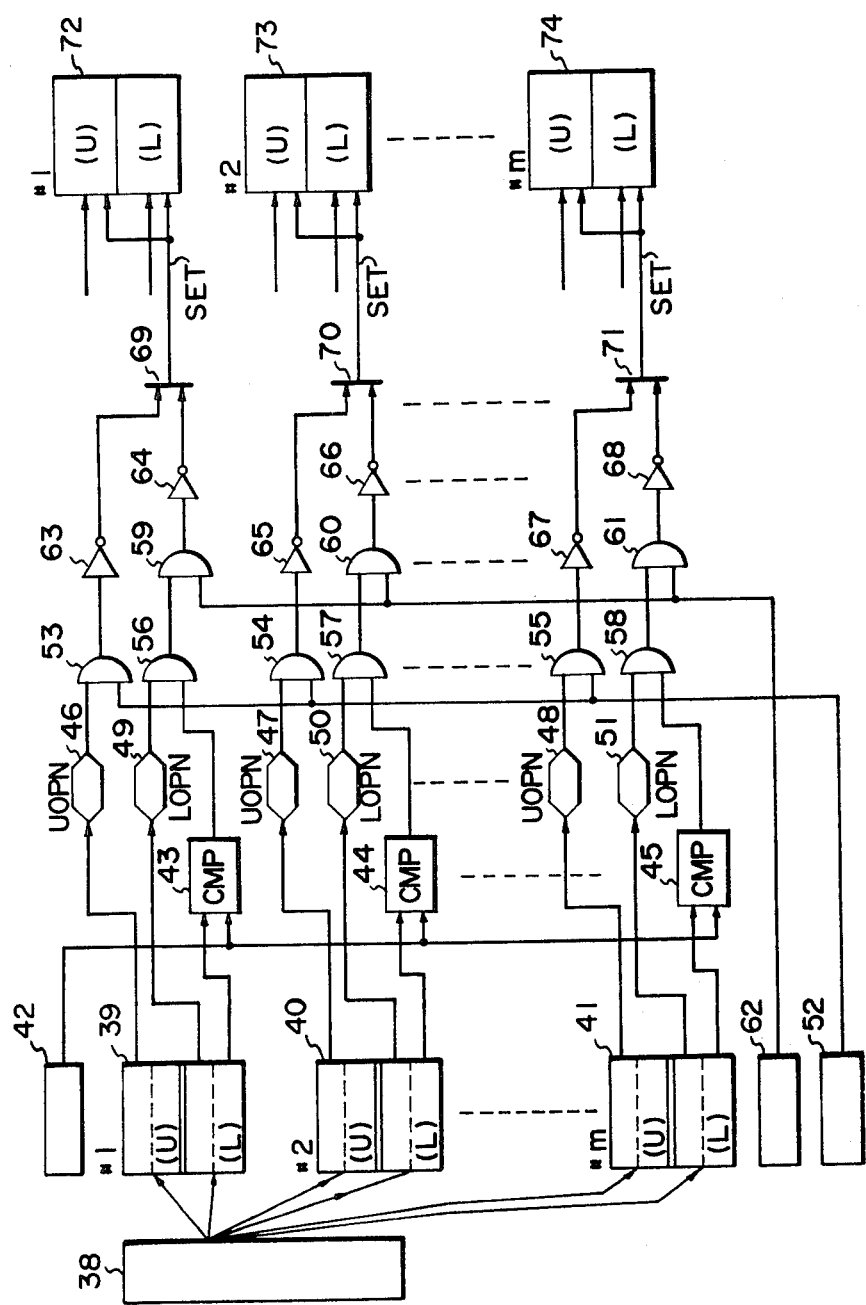
FIG. 9 is a diagram showing the entire system of one embodiment of this invention.

In the case where the profile figure 9 such as shown in FIG. 5D is imagined in place of the pattern 2 to be recognized, depicted in FIG. 5A, and the particular segments 6, 7 and 8 for the profile figure 9 are to be obtained, the particular segments extracted as set forth above in connection with FIGS 5B and 5C are subjected to the following processing to leave only the desired particular segments 6, 7 and 8.

(3) It is checked whether or not the starting and the terminating points of each of the particular segments extracted as mentioned above in respect of FIGS. 5B and 5C are in contact with the pattern 2. The endpoints marked with crosses in FIGS. 5E and 5F are the endpoints which are in contact with the pattern 2, and the endpoints marked with circles are open endpoints which are not in contact with the pattern 2.

Figure 5E:
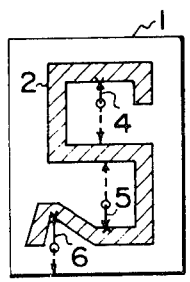
Figure 5F:
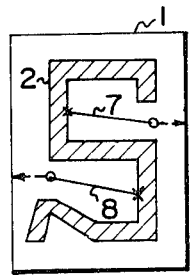

(4) And the particular segments are extended from the abovesaid open endpoints as shown in FIGS. 5E and 5F and the extensions are checked as to whether or not they are blocked by the pattern 2. In the illustrated case, the particular segments 4 and 5 are blocked but the particular segments 6, 7 and 8 are not blocked.

(5) The non-blocked particular segments 6, 7 and 8 extracted by the abovesaid processing 4) are coincident with the particular segments 6, 7 and 8 to be obtained, which are shown in FIG. 5D.

Figure 6A:
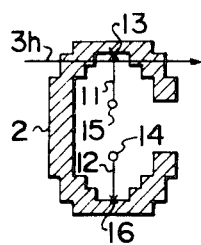
FIGS. 6A to 6C, inclusive, are explanatory of processing for extraction of blocked extension of a particular segment according to this invention.

The extractor of this invention is to obtain the particular segments 6, 7 and 8 by executing such processing as described above. Referring now to FIGS. 6A and 6C, a description will be made of the processing for checking whether the extension from the open endpoint of the particular segment is blocked or not.

Figure 6B:
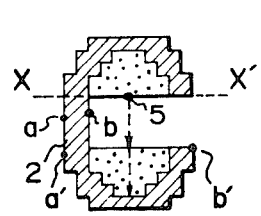
Figure 6C:
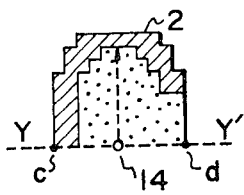

In FIGS. 6A to 6C, reference numeral 2 indicates the patterns to be recognized; 3h designates horizontal scanning lines; 11 and 12 identify horizontal scanning particular segments; 13 and 14 denote their starting point; and 15 and 16 represent their terminating points.

The extraction of the starting point of the particular segment is achieved by such processing, for instance, as described hereinbelow:

(6) The horizontal scanning of the figure starts from the upper left-hand end of the figure frame to the right and gradually goes down to the lower scanning lines one after another, thereby to check for points forming the particular segment on three adjacent scanning lines, that is, upper, middle and lower scanning lines #1L to #3L described later. (Since the particular segment is formed by linking black mesh points imagined to exist intermediate between the pattern strokes, the points forming the particular segment will hereinafter be referred to as the intermediate points.)

(7) And in the case where no intermediate point exists on the upper scanning line but the intermediate point is present on the middle scanning line, it is decided that the starting point of the particular segment exists at the co-ordinates of the intermediate point (the row co-ordinates) on the middle scanning line. In this manner, the starting points 13 and 14 shown in FIG. 6A are extracted.

Further, the extraction of the terminating end of the particular segment is accomplished, for example, by the following processes:

(8) The abovesaid intermediate points are checked for their presence on the three scanning lines mentioned in the above process 6).

(9) The continuity of the particular segment is determined depending upon whether or not the intermediate point on each of the upper, middle and lower scanning lines lies within a predetermined mesh on the co-ordinates (the row co-ordinates).

(10) And in the case where the intermediate point aligning itself with that on the upper scanning line exists on the middle scanning line but no intermediate point aligning itself with the intermediate point on the middle scanning line exists on the lower scanning line, it is decided tht the particular segment terminates at the co-ordinates of the intermediate point on the middle scanning line (the row co-ordinates). Thus, the terminating points 15 and 16 shown in FIG. 6A are extracted.

For checking whether the starting point of the particular segment is in contact with the pattern 2 or what is called the open endpoint in this invention, for example, the following process is carried out.

(11) When the starting point of the particular segment is extracted by the above process 7), the region of existence (the row co-ordinates) of the pattern information on the upper scanning line is compared with the co-ordinates of the extracted starting point.

(12) Depending upon whether the latter co-ordinates lie in the region of the former co-ordinates or not, it is decided that the starting point of the particular segment is in contact with the pattern 2 or the open endpoint.

Further, for checking whether the terminating point of the particular segment is in contact with the pattern 2 or the open endpoint, for instance, the following process is achieved.

(13) When the terminating point is extracted by the above process 10), the region of existence (the row co-ordinates) of the pattern information on the lower scanning line and the co-ordinates of the extracted terminating point are compared with each other.

(14) Also in this case, the terminating point is decided to be in contact with the pattern 2 or the open endpoint depending upon whether the latter co-ordinates are present in the region of the former co-ordinates.

By such processing as described above, the co-ordinates of the starting and terminating points of the particular segment and their characteristics are extracted. The extraction of the blocked extension of the open endpoint of the particular segment in this invention takes place in the following way:

(15) FIG. 6B shows the extraction of the blocked extension in the case where the terminating point is the open end. In this case, it is decided that the terminating point 15 is the open end on the scanning line indicated by the broken line X—X' in FIG. 6B. The row co-ordinates of the open end are stored.

(16) The pattern stroke existing region a–b or a'–b' on each of the scanning lines following the line X—X' is examined to check for the presence of the co-ordinates of the terminating point 15 in the above pattern stroke existing region a–b or a'–b'. If the co-ordinates of the terminating point 15 lie in the pattern stroke existing region, the extension of the terminating point 15 is decided to be blocked by the pattern 2. If the co-ordinates of the terminating point 15 do not lie in the pattern existing region, the extension of the terminating point 15 is decided not to be blocked.

(17) A processing circuit for determining the region of existence of the pattern stroke on each scanning line by the process 16) is referred to as a stroke pattern generator circuit in this invention.

(18) The abovesaid stroke pattern generator circuit is adapted to perform processing for determining the point $a$ or $a'$ at which the pattern information changes from a white mesh point to a black one on each scanning line and the point $b$ or $b'$ at which the pattern information changes from the black mesh point to the white mesh point on each scanning line, thereby to decide that the pattern stroke exists between the above points.

(19) FIG. 6C shows the extraction of the blocked extension in the case where the starting point is the open end. In this case, it is decided that the starting point 14 is the open end on the scanning line Y—Y'.

(20) A figure projection of the pattern 2 (a figure projection in a direction perpendicular to the scanning direction) is obtained from the pattern information obtained until the scanning line Y—Y' is scanned. If the co-ordinates of the starting point 14 lie in the region c–d of the abovesaid figure projection, the extension of the starting point 14 is regarded as being blocked by the pattern 2. If the co-ordinates of the starting point 14 does not lie in the figure projection region c–d, the extension of the starting point 14 is regarded as being not blocked by the pattern 2.

(21) A processing circuit for obtaining the figure projection by the above process 20) is called a figure projection pattern generator circuit in this invention.

(22) The figure projection pattern generator circuit is required only to successively superimpose the pattern information obtained on the respective scanning lines, and is a known circuit.

Figure 7A:
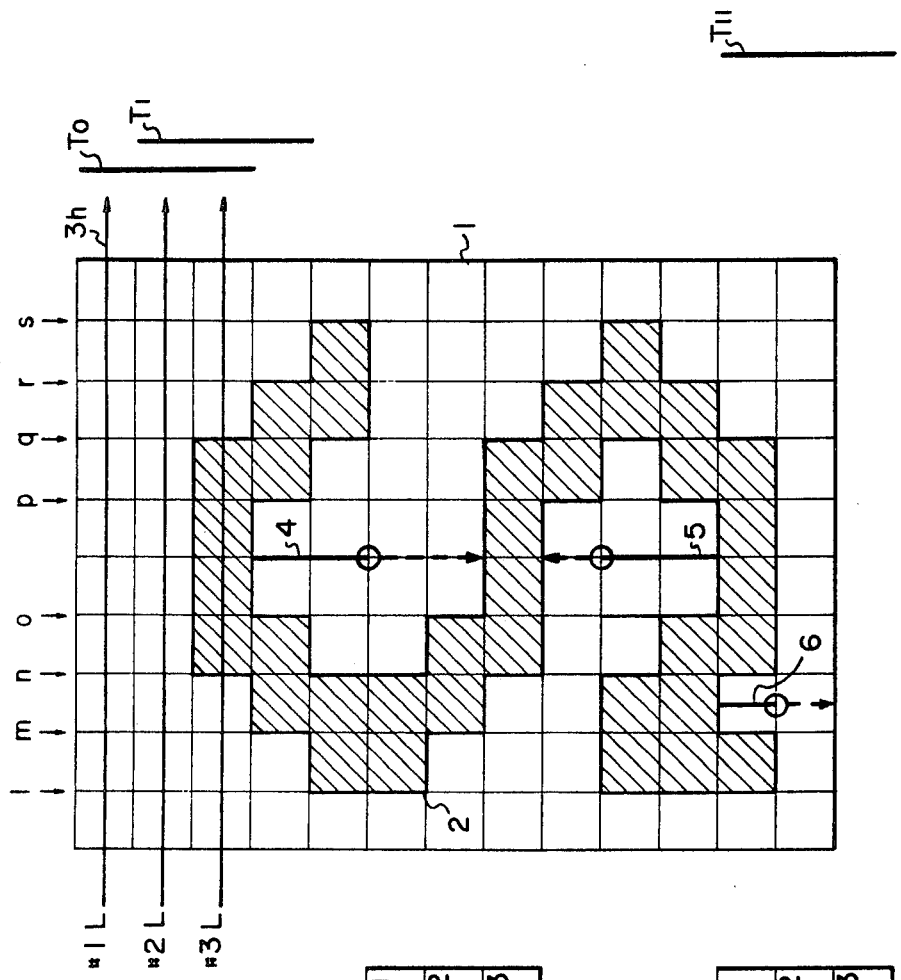
FIGS. 7A, 7B and 8 are diagrams explanatory of the operation of a characteristic extractor embodying this invention and a time chart, respectively.
Figure 7B:
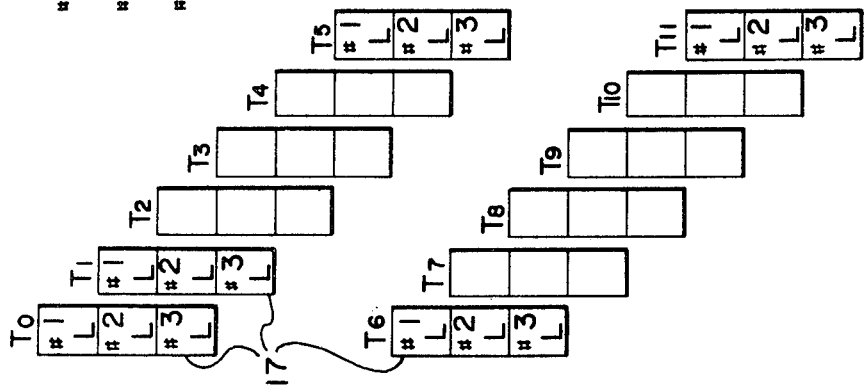
Figure 8:
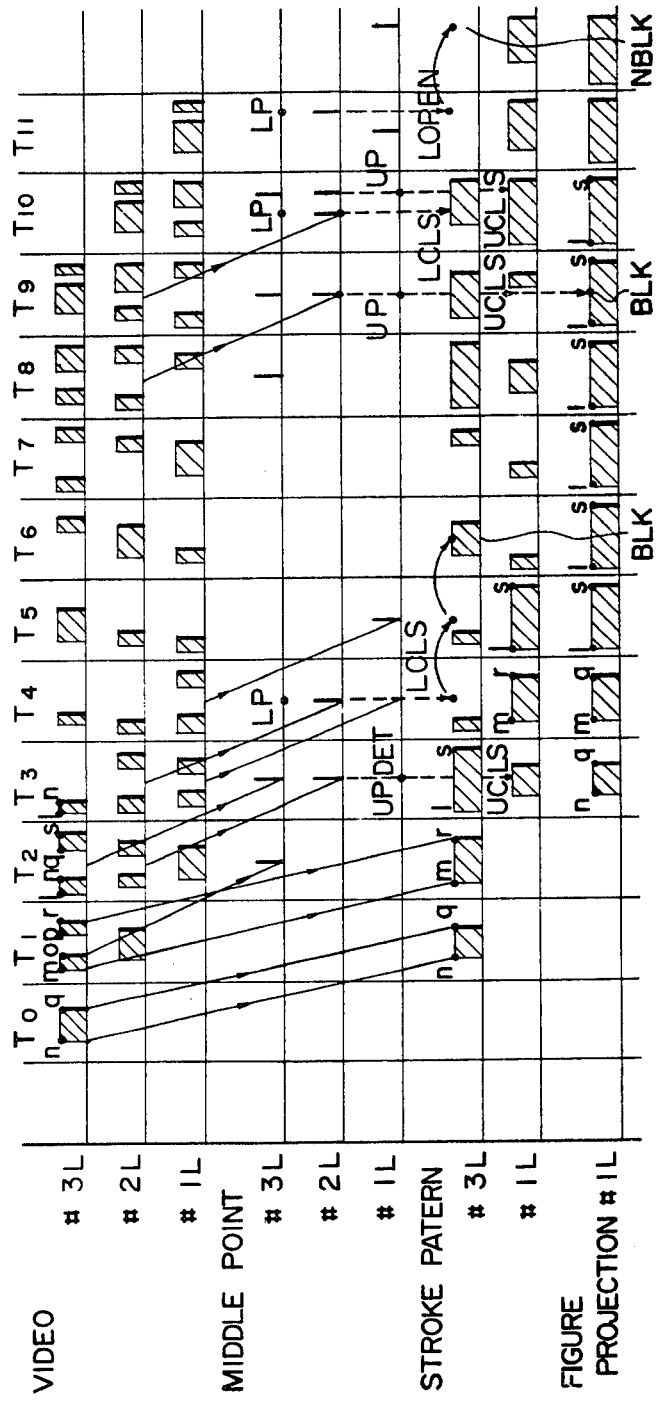

FIGS. 7A, 7B and 8 are explanatory of the processing for extracting blocked endpoints of the horizontal scanning particular segments 4, 5 and 6 according to this invention in the case where the pattern 2 to be recognized is a character "S".

The pattern scanning by the characteristic extractor of this invention is adapted to obtain the pattern information on each scanning line by flying spot scanning means such, for example, as a flying spot scanner in a known manner. However, the abovesaid particular segment endpoint extraction, endpoint characteristic extraction and blocked extension extraction are achieved while checking the pattern information on three adjacent scanning lines #1L, #2L and #3L at the same timing. To perform this, it is sufficient only to prepare two stages of delay circuits corresponding to one scanning line, as is well-known in the art.

The scanning for checking the pattern information on the three scanning lines #1L to #3L at the same timing may be such scanning employing observation windows 17 of apparently 1 × 3 meshes, as shown in FIG. 7B.

Between scanning moments $T_0$ and $T_{11}$ by the observation windows 17, scanning information (video) of the pattern 2 sequentially appears as indicated by hatched portions in FIG. 8 for each of the upper, middle and lower scanning lines #1L, #2L and #3L. And the intermediate point of each scanning line is determined as shown in FIG. 8.

In the illustrated example, at the scanning moments $T_3$, $T_9$ and $T_{10}$, the starting points (upper end points) of particular segments are extracted, as described previously with regard to the process 7). The starting point of the particular segment 4 extracted at the scanning moment $T_3$ is determined to be an endpoint making contact with the pattern 2 (upper end closed), as explained previously in connection with the processes 11) and 12). The starting point extracted of the particular segment 5 extracted at the scanning moment $T_9$ is determined to be an open end (upper end open), as set forth in respect of the processes 11) and 12), and this particular segment 5 is determined to be blocked as described with respect to the processes 19) and 22) and FIG. 6. Further, the starting point of the particular segment 6 extracted at the scanning moment $T_{10}$ is determined to be (upper end closed), as is the case with the starting point extracted at the scanning moment $T_3$.

In the illustrated example, at the scanning moments $T_4$, $T_{10}$ and $T_{11}$, the terminating points (lower ends) of the particular segments are extracted, as explained previously in connection with the process 10). The terminating points of the particular segments 4 and 6 extracted at the scanning moments $T_4$ and $T_{11}$, respectively, are determined to be open ends (lower end open), as described previously set forth with regard to the processes 13) and 14). And the particular segments are checked for the presence of the blocked state, as described with reference to the processes 15) to 18) and FIG. 6B. The terminating point of the particular segment 4 extracted at the scanning moment $T_4$ is determined to be blocked at the scanning moment $T_6$, but the terminating end of the particular segment 6 extracted at the scanning moment $T_{11}$ is determined not to be blocked. Further, the terminating point of the particular segment 5 extracted at the scanning moment $T_{10}$ is determined to be an endpoint making contact with the pattern 2 (lower end closed), as explained in connection with the processes 13) and 14).

FIG. 9 illustrates the construction of an embodiment of this invention. In FIG. 9, reference numeral 38 indicates a particular segment extractor, which determines the co-ordinates of the starting and terminating points of each particular segment (the endpoint co-ordinates) and whether the respective endpoints are the open ends or not (the endpoint characteristic), as explained with regard to the processes 6) to 14), during the scanning by the observation windows 17 as shown in FIG. 8. Reference numerals 39 to 41 designate particular segment memories, in which are respectively stored the endpoint co-ordinates and the endpoint characteristics of the particular segments extracted by the particular segment extractor 38. Reference numeral 42 identifies a scanning point row counter, which counts the row co-ordinates during the scanning by the observation windows 17 shown in FIG. 7B. Reference numerals 43 to 45 denote comparator circuits, from which the row co-ordinates of the terminating points respectively set in the particular segment memories 39 to 41, as mentioned above, are derived at each scanning while being delayed for one scanning period. Reference numerals 46 to 48 represent flip-flops which are set when the starting points of the particular segments are the open ends; 49 to 51 show flip-flops which are set when the terminating points of the particular segments are the open ends; 52 refers to a figure projection pattern generator circuit, which generates such a figure projection pattern as described above in connection with the processes 19) to 22) and FIG. 6C. Consequently, the state in which AND circuits indicated by 53 to 55 generate the logic "1" is representative of the state in which the open upper endpoint is determined to be blocked at the scanning moment $T_9$ shown in FIG. 8. Reference numerals 56 to 61 designate AND circuits; and 62 identifies a stroke pattern generator circuit, which generates such a stroke pattern as set forth in connection with the processes 15) to 18) and FIG. 6B. Consequently, the state in which the AND circuits 59 to 61 generate the logic "1", corresponds to the state in which the endpoint such as the lower-end-opened endpoint extracted at the scanning moment $T_4$ in FIG. 8 is determined to be blocked at the scanning moment $T_6$. Reference numerals 63 to 68 denote inverter circuits; 69 to 71 represent OR circuits; and 72 to 74 show macroscopic characteristic memories, in which the co-ordinates of the starting and terminating points of the particular segments are stored when the OR circuits 69 to 71 respectively provide their set outputs. That is, in the macroscopic characteristic memories 72 to 74, there are stored only the co-ordinates of the starting and terminating ends of such a particular segment as that 6 stored in the particular segment memories 39 to 41, shown in FIG. 7A. It is also possible to arrange the macroscopic characteristic memories to store the endpoint characteristics.

As described above, with this invention, it is possible to extract, from the extracted particular segments, only such a particular element that the extension of at least one of the starting and terminating points is blocked by the stroke of the pattern 2. Therefore, the present invention is of particular utility when employed in clustering process in the case where only such particular segments as shown in FIG. 5D are extracted and the number of categories of recognition is large.

FIG. 9 shows the embodiment of this invention for extraction of the macroscopic characteristics solely by the particular segments, that is, the -shaped profile figure. But it is also possible to extract the ⌐ -shaped profile figure by the reflection segments in exactly the same manner.

FIGS. 10A to 10E are diagrams explanatory of the operation of the figure projection pattern generator circuit 52 and the stroke pattern generator circuit 62 shown in FIG. 9, and their block diagrams.

Figure 10A:
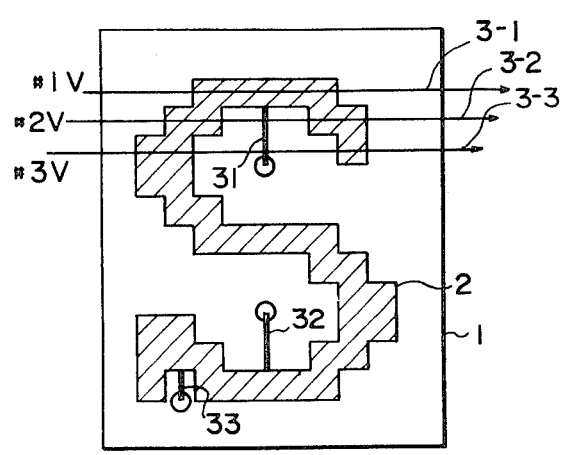
FIGS. 10A to 10E are diagrams explanatory of the operations of a figure projection pattern generator circuit and a stroke pattern generator circuit used in the embodiment of FIG. 9 and their block diagrams.
Figure 10B:
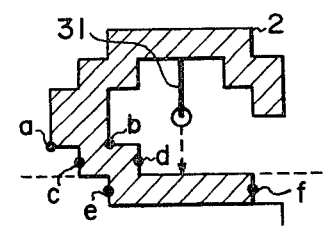
Figure 10C:
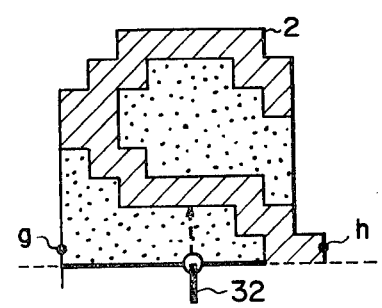

In FIGS. 10A to 10C, reference numerals 1, 2 and 3 correspond to those in FIGS. 1A and 1B, and 31 to 33 indicate particular segments. The pattern to be recognized is scanned along ech scanning line by means of, for instance, a flying spot scanner. But in the extraction of the reflection segment and the particular segment, determination of the endpoint of each segment and determination of the non-blocked segment, the scanning information on three scanning lines is obtained at the same timing, as described above, for effecting sequential extraction and determination during the above scanning. And the points which will ultimately form the particular segment are determined in accordance with the scanning information #2V on the middle scanning line 3-2. Where there exist on the scanning lines 3-2 and 3—3 such points which are in a row but no such point exists on the scanning line 3-1, it is decided that the starting point of the particular segment is present. Where such points are present on the scanning lines 3-1 and 3-2 but no such point is present on the scanning line 3—3, it is decided that the terminating point of the particular segment is in existence.

Figure 10D:
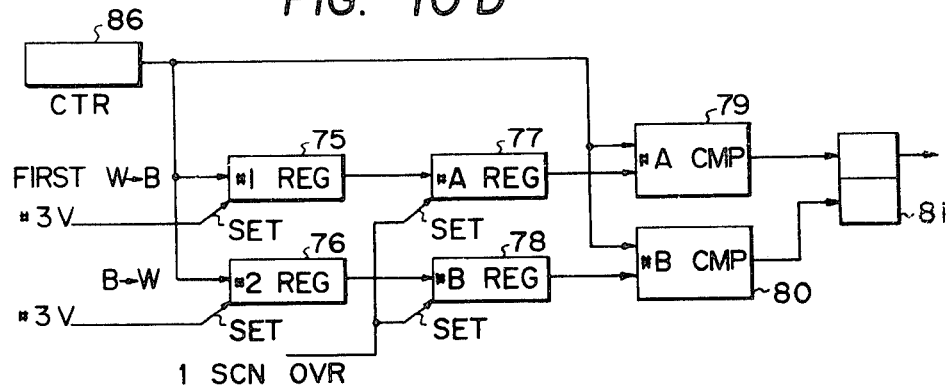

FIGS. 10B and 10D respectively show the processing for checking the terminating point of the particular segment in a direction perpendicular to the scanning direction to determine whether or not the terminating point is blocked by the pattern stroke, and an example of a pattern generator for performing the abovesaid processing. In FIG. 10D, reference numeral 86 indicates a row counter, in which the co-ordinates of scanning points in the horizontal scanning are sequentially set; 75 to 78 designate registers in which the content of the row counter is set at a given timing for setting; 79 to 80 identify comparator circuits; and 81 denotes a flip-flop.

Let it be assumed that the terminating point (indicated by the circle in FIG. 10B) of the particular segment has been detected as a result of the scanning, as shown in FIG. 10B. At this time, use is made of the scanning information #3V on the scanning line 3—3 immediately below the scanning line 3-2 on which the abovesaid terminating point lies. That is, as illustrated in FIG. 10D, at the timing at which the scanning information +3V changes from a white mesh W to a black one B, the content of the row counter 8 (the co-ordinates corresponding to the above timing) is set in the #1 register 75. Similarly, at the timing at which the scanning information #3V changes from the black mesh B to the white one W, the content of the row counter 86 (the co-ordinates corresponding to the above timing) is set in the #2 register 76. The contents of these registers are respectively set in the #A and #B registers 77 and 78 in the period corresponding to the next scanning, and then compared by the comparator circuits 79 and 80 with the content of the row counter 86. In other words, when the content of the row counter 82 coincides with the content of the #A register 77 as the abovesaid next scanning proceeds, the flip-flop 81 is reset. This implies the following fact. That is, in each scanning, the flip-flop 81 is put in its set state for a period of time corresponding to the region in which the pattern stroke exists, that is, the region between points $a$ and $b$, or $c$ and $d$, or $e$ and $f$, . . . When the terminating point of the particular segment has been determined as shown in FIG. 10B and the co-ordinates of the terminating points have been stored, it is checked whether the flip-flop 81 is in its set state or not each time the scanning point passes the horizontal co-ordinates of the abovesaid terminating point on each of the subsequent scanning lines. If the flip-flop 81 is in its set state, it implies that the terminating point is blocked. In the case of FIG. 10B, when the stroke existing region e-f is detected, the blocked state is determined.

Figure 10E:
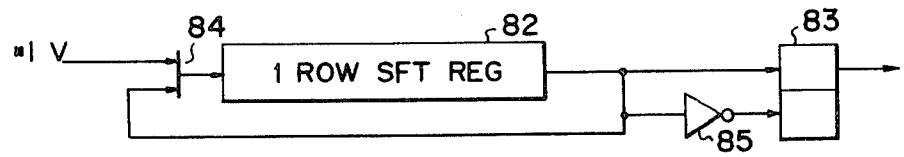
Figure 12A:
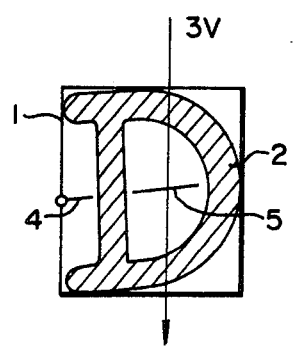
FIGS. 12A to 12D are explanatory of generation of the reflection segment and the particular segment in the case of vertical and horizontal scanning of "D", "7", "4" and "+", respectively.
Figure 12B:
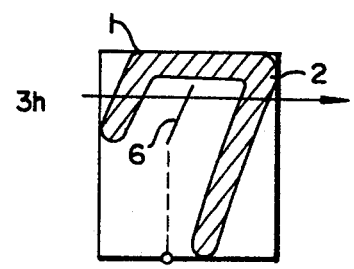
Figure 12C:
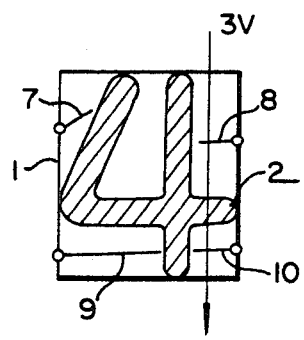
Figure 12D:
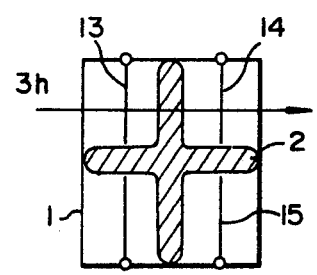
Figure 13A:
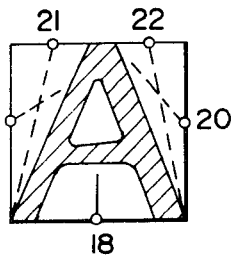
FIGS. 13A to 13D show examples of coding of "A", "B", "C" and "D" by this invention (a code PSC based on the particular segment and a code based on the reflection segment).
Figure 13A:
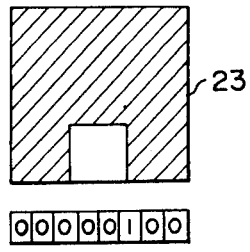
Figure 13A:
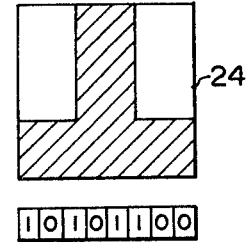
Figure 13B:
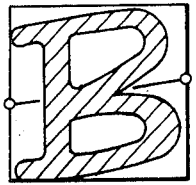
Figure 13B:
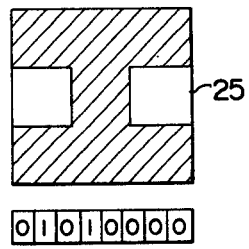
Figure 13B:
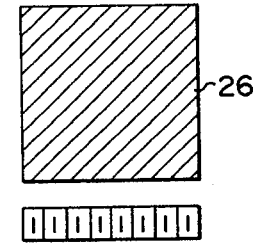
Figure 13C:
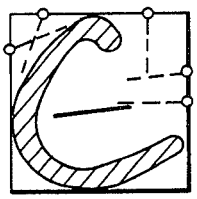
Figure 13C:
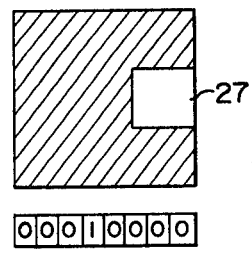
Figure 13C:
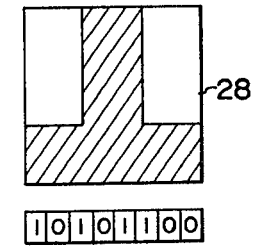
Figure 13D:
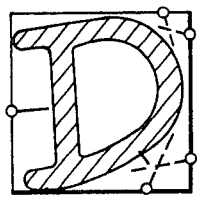
Figure 13D:
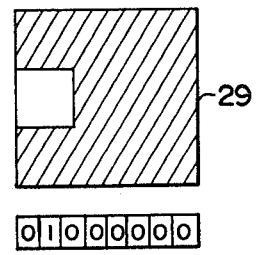
Figure 13D:
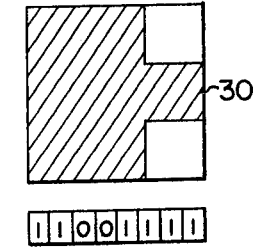

FIGS. 10C and 10E respectively show the processing of checking the starting point of the particular segment in the direction perpendicular to the scanning direction to determine whether or not the starting point is blocked by the pattern stroke, and an example of a figure projection pattern generating part for performing the abovesaid processing. In FIG. 10E, reference numeral 82 indicates a row shift register; 83 designates a flip-flop; 84 identifies an OR circuit; and 85 denotes a NOT circuit.

Assume that the starting point (indicated by the circle in FIG. 10C) of the particular segment 32 has been detected as shown in FIG. 10D. At this time, use is made of the scanning information #1V on the scanning line 3-1 immediately preceding the scanning line 3-2 on which the abovesaid starting point exists. That is, as illustrated in FIG. 10E, the scanning information #1V obtained at each scanning is supplied to the shift register 82, and fed back thereto through the OR circuit 84 is a known manner, providing such figure projection as depicted in FIG. 10C. The dotted region in FIG. 10C is compulsorily altered by the figure projection to black mesh points. When the starting point of the particular segment 32 has been determined as described above, the content of the shift register 82 has the logic "1" for a period corresponding to the period between points g and h in FIG. 10C. For this period, the flip-flop 83 is held in its set state. Accordingly, if the flip-flop 83 is in its set state at the moment of detection of the starting point, it means that the starting point is blocked. The starting point shown in FIG. 10C is blocked, as depicted.

In the present invention, it is needless to say that when a non-blocked endpoint is detected (that is, when a non-blocked segment is extracted) by the above processing, the position on the figure frame 1 to which the non-blocked endpoint corresponds is determined by its co-ordinates, and encoded.

FIGS. 13A to 13D correspond to FIGS. 4A to 4D, respectively, in connection with the cases of the characters "A", "B", "C" and "D", showing the codes PSC and RSC concerning the particular segment and the reflection segment. With the code PSC, the depression feature of the character can be recognized and, with the code RSC, the projection feature can be recognized.

As has been described in the foregoing, in the present invention, the non-blocked reflection segment or particular segment is obtained and the position on the figure frame to which the endpoint of the above segment corresponds is encoded, thereby to obtain profile characteristics of the pattern to be recognized. Consequently, pattern recognition can be accomplished with the characteristics which are unsusceptible to the variations in the pattern and suitable for clustering in the case where the number of categories is large. Thus, high-speed processing is possible in the extraction of macroscopic characteristics of the pattern to be recognized.

It will be apparent that many modifications and variations may be effected without departing from the scope of the novel concepts of this invention.

What is claimed is:

1. A pattern recognition processing system in which a pattern to be recognized is scanned to extract, as an imaginary segment, a white area defined between figure strokes and between the pattern stroke and circumscribed frame for the recognition of the pattern, said system comprising segment extracting means for extracting the starting and terminating endpoints of the segment and detecting whether the endpoints are in contact with the pattern stroke, and open endpoint extension processing means for extending the segment from the endpoints if the endpoint is an open endpoint out of contact with the pattern stroke, whereby to extract the segment that the extension of at least one of the open endpoints of the extracted segment is not blocked by the pattern stroke.

2. The pattern recognition processing system according to claim 1, wherein the open endpoint extension processing means comprises a figure projection pattern generator circuit for sequentially determining figure projection patterns of the pattern to be recognized in a direction crossing the scanning direction of the pattern to be recognized during scanning thereof, and a blockade determination circuit for determining whether or not the co-ordinates of the extracted open endpoint lie in the region of the figure projection pattern.

3. The pattern recognition processing system according to claim 2, wherein while the pattern to be recognized is scanned in one direction, information on a plurality of scanning lines is observed at the same timing, and wherein the figure projection pattern generator circuit is adapted to determine the figure projection pattern based on the information on the information of the scanning line different from the detection of open endpoint.

4. The pattern recognition processing system according to claim 1, wherein the open endpoint extension processing means comprises a stroke pattern generator circuit by which while the pattern to be recognized is scanned in one direction, the existing region of a pattern stroke is determined on each scanning line, and a blockade determination circuit by which when the endpoint of the segment has been detected to an open endpoint, each stroke pattern existing region on the scanning lines following the detecting position and the coordinates of the open endpoint are compared with each other.

5. The pattern recognition processing system according to claim 4, wherein the stroke pattern generator circuit is adapted to determine the pattern stroke existing region, assuming that a white mesh point in a white mesh point existing between black mesh points defined between black mesh points is a black mesh point during scanning.

6. The pattern recognition processing system according to claim 3, wherein while the pattern to be recognized is scanned in one direction, information on a plurality of scanning lines is observed at the same timing, and wherein the stroke pattern generator circuit is adapted to determine the pattern of the stroke existing region based on the information on the information of the scanning line different from the detection of open endpoint.

7. A pattern recognition processing system in which a pattern to be recognized is scanned to extract characteristics of white areas in a figure frame including the pattern to obtain profile characteristics of the pattern, said system comprising endpoint co-ordinate determining means determining the co-ordinates of starting and terminating points of a reflection segment representative of a white area present between the figure frame and a pattern stroke and a particular segment representative of a white area present between adjacent ones of pattern strokes, a non-blocked segment extracting means for checking the coordinates of at least one of the starting and terminating points determined by the endpoint co-ordinate determining means in a direction across the direction of the scanning to extract the reflection segment and the particular segment which are not blocked by the pattern stroke, and coding means for coding the position on the figure frame of the the non-blocked endpoint co-ordinates of the extracted reflection and particular segments in the direction across the scanning direction, in which the codes of the reflection and particular segments are combined to extract the profile characteristics of the pattern to be recognized.

8. The pattern recognition processing system according to claim 7, wherein the non-blocked segment extracting means comprises a figure projection part for effecting figure projection of the pattern in a direction across the scanning direction, and wherein the endpoint co-ordinates of the reflection and particular segments are compared with the projection of figure projection obtained by the figure projection part to determine the non-blocked endpoints.

9. The pattern recognition processing system according to claim 7, wherein the non-blocked segment extracting means comprises a pattern stroke co-ordinates determination part for determining the co-ordinates of pattern stroke existing region present on each scanning line, and wherein the endpoint co-ordinates of the reflection and particular segments are compared with the stroke existing co-ordinates region obtained by the pattern stroke co-ordinates determination part to determine the non-blocked endpoints.

10. The pattern recognition processing system according to claim 7, wherein the pattern to be recognized is scanned in a plurality of directions crossing each other to obtain codes of the reflection and particular segments corresponding to the respective scanning.

* * * * *

UNITED STATES PATENT AND TRADEMARK OFFICE
CERTIFICATE OF CORRECTION

PATENT NO. : 4,105,998
DATED : August 8, 1978
INVENTOR(S) : MASUMI YOSHIDA ET AL.

It is certified that error appears in the above-identified patent and that said Letters Patent are hereby corrected as shown below:

Col. 2, line 6, "biending" should be --bending--;

Col. 2, line 29, "Japn" should be --Japan--;

Col. 3, line 18, after "of" insert --[⊔]--;

Col. 3, line 19, before "-shaped" insert --[⊓]--;

Col. 5, line 66, "particulr" should be --particular--;

Col. 6, line 37, "The" should be --the--;

Col. 8, line 6, "tht" should be --that--;

Col. 11, line 33, before "-shaped" insert --[⊔]--;

Col. 11, line 44, "ech" should be --each--;

Col. 12, line 64, "is" should be --in--.

Signed and Sealed this

Thirteenth Day of March 1979

[SEAL]

Attest:

RUTH C. MASON
Attesting Officer

DONALD W. BANNER
Commissioner of Patents and Trademarks